United States Patent [19]

Dubrovsky et al.

[11] Patent Number: 5,269,934
[45] Date of Patent: Dec. 14, 1993

[54] REMOVAL OF OILY RESIDUES FROM AQUEOUS WASTE STREAMS

[75] Inventors: Michael Dubrovsky, Berkeley; Steven D. Lynch, San Rafael; Steven F. Sciamanna, Moraga, all of Calif.

[73] Assignee: Chevron Research and Technology Company, San Francisco, Calif.

[21] Appl. No.: 957,347

[22] Filed: Oct. 6, 1992

[51] Int. Cl.$^5$ .............................................. B01D 61/00
[52] U.S. Cl. .................................... 210/651; 210/652; 210/653; 210/636; 210/639; 210/778
[58] Field of Search ............... 210/651, 650, 652, 799, 210/636, 791, 333.01, 388, 509, 510.1, 500.25, 749, 708, 321.67, 653, 654, 778, 193, 639

[56] References Cited

U.S. PATENT DOCUMENTS

| | | | |
|---|---|---|---|
| 4,194,972 | 3/1980 | Weintraub et al. | 210/708 |
| 4,253,962 | 3/1981 | Thompson | 210/321.69 |
| 4,313,830 | 2/1982 | Tulin et al. | 210/778 |
| 4,332,686 | 6/1982 | Gerlach et al. | 210/708 |
| 4,797,214 | 1/1989 | Sevier | 210/651 |
| 4,846,976 | 7/1989 | Ford | 210/651 |
| 4,872,988 | 10/1989 | Culkin | 210/636 |
| 4,872,991 | 10/1989 | Bartels et al. | 210/651 |

FOREIGN PATENT DOCUMENTS 3226989 3/2989 Australia.

OTHER PUBLICATIONS

Hammer, J. Mark, "Water and Waste Water Technology," 2nd Ed. John Wiley & Sons N.Y. pp. 282-284.
Lahoussine-Turcaud, et al., "Coagulation Pretreatment for Ultrafiltration of a Surface Water"; Jour. AWWA; Dec. 1990; pp. 76-81.
Bhave, et al.; "Removal of Oily Contaminants in Wastewater with Microporous Alumina Membranes"; AIChE Symposium Series: No. 261 vol. 84, pp. 19-27.

Primary Examiner—Robert A. Dawson
Assistant Examiner—Ana M. Fortuna
Attorney, Agent, or Firm—James W. Ambrosius; W. Keith Turner

[57] ABSTRACT

A process for removing oily residues from aqueous waste streams using a cross-flow filtration system in which the efficiency of a dynamic membrane system comprising a gel layer and supporting semipermeable membrane is optimized by applying a controlled shear force parallel to the plane of the membrane.

9 Claims, No Drawings

REMOVAL OF OILY RESIDUES FROM AQUEOUS WASTE STREAMS

BACKGROUND OF THE INVENTION

The field of the invention is cross flow filtration used to remove oily residues from aqueous waste streams.

Aqueous waste streams produced by petroleum producing and processing operations often contain oily residues that must be removed before discharge. Conventional methods for removing the residues often require the use of large settling tanks or bulky equipment which are impractical in locations where space is limited, as, for example, on an off-shore oil platform. Filtration devices, although showing promise have been found to quickly clog under field operating conditions and require frequent maintenance to remain operable.

The use of cross-flow filtration in which the feed stream flows under pressure parallel to the filter surface producing two streams out of the filter module has been described by R. H. Bhave et al. in "Removal Of Oily Contaminants In Wastewater With Microporous Alumina Membranes" (AIChE Symposium Series, No. 261, Vol. 84, pages 19-27). Cross-flow filtration due to the continual sweeping of the membrane surface by the feed stream usually will demonstrate less fouling of the membrane than flow through filtration and, as such, is able to operate for a longer period of time before cleaning is required.

Field tests conducted using ceramic membranes in cross-flow filtration systems to remove oil and grease from aqueous waste streams produced on off-shore platforms have found that although initially the membrane separation process reduced the total organics to low levels, fouling of the membrane remains a problem in the presence of certain organics. Over long duration runs the filtration rate decreases significantly, and the membranes have been found to be difficult to clean.

SUMMARY OF THE INVENTION

The present invention is directed to a process for recovering water with a lower concentration of hydrocarbon contamination from an aqueous waste stream containing free hydrocarbon contaminants comprising the steps of:

(a) contacting a waste stream feed containing free hydrocarbon contaminants in parallel flow under pressure with the outer surface of a semipermeable membrane having an inner and outer surface;

(b) controlling the concentration of a gelation agent in the waste stream feed to a concentration calculated to form a gel layer on the outer surface of the semipermeable membrane, whereby the gel layer and the semipermeable membrane form a dynamic membrane system capable of separating the waste stream into a concentrate component on the outer surface of the dynamic membrane system and a filtrate component on the inner surface of the semipermeable membrane;

(c) creating a controlled shear force at the outer surface of the gel layer by vibrating the semipermeable membrane at a preselected frequency and amplitude in a plane parallel to that of the semipermeable membrane of sufficient magnitude to create turbulent flow at the outer surface of the gel layer in order to maintain an optimal thickness of the gel layer such that the flux across the dynamic membrane system is maximized and the concentration of the hydrocarbon contaminant in the filtrate component is minimized; and (d) collecting separately the concentrate component the filtrate component which contains a reduced concentration of hydrocarbon contaminants relative to the waste stream feed.

In one preferred embodiment of the invention the frequency and amplitude of the vibration of the semipermeable membrane is controlled at a level calculated to detach the gel layer from the semipermeable membrane but insufficient to damage the gel layer.

As used herein the term "semipermeable" refers to the ability of the membrane to selectively allow the passage of water across its surface while excluding the passage of the gelation agent. The term "dynamic membrane system" refers to the combination of the gel layer and the underlying semipermeable membrane which acts as a support. The system is referred to as "dynamic" because the particles that make up the gel layer are in constant motion during operation, and the thickness of the layer may be controlled by changing the amplitude and frequency of the shear forces applied to the semipermeable membrane.

"Hydrocarbon contamination" as used in this specification refers primarily to free oil and grease present in the waste stream, that is oil or grease which is not dissolved in the aqueous stream but are present as colloidal particles, globules, or the like. Hydrocarbon contamination may be measured as total organic carbon, sometimes referred to as TOC, and may be determined using procedures well known in the art.

"Parallel flow" refers to the passage of the waste stream parallel to the plane of the semipermeable membrane, and the general description of the process that is the present invention is that which is referred to in the art as a "cross-flow" filtration system.

DETAILED DESCRIPTION OF THE INVENTION

During filtration with stationary membranes, a layer of unfilterable solids/oil forms at the surface of the semipermeable membrane. This layer operates as a secondary membrane layer and affects tile filtration efficiency and filtration rate across the membrane. Depending on the properties of this layer, the layer could improve the efficiency of filtration (i.e., filter out particles that are finer than the pore size of the original semipermeable membrane), or it can markedly reduce the rate of filtration. This secondary layer that forms on the surface of the semipermeable membrane is referred to in this specification as the "gel layer".

The characteristics of the gel layer that forms adjacent to the outer surface of the semipermeable membrane depends on the type of solids, the presence of surfactants or free and dissolved solids, the concentration of solids and organics, temperature, and the fluid dynamics at the membrane surface. In the present invention a gelation agent is employed to form the gel layer.

The gelation agent may be added to the waste stream prior to contact with the membrane, but most preferably the gelation agent is already present in the waste stream, and its concentration is adjusted to give the desired characteristics to the gel layer. Iron hydroxide, i.e., ferric hydroxide or ferrous hydroxide or a mixture thereof, can be used to form a suitable gel layer for the removal of hydrocarbon contaminants from aqueous waste streams and is commonly present in the discharge streams from petroleum production facilities. Iron hydroxide is also relatively inexpensive. As such iron hydroxide represents a preferred gelation agent for use with this invention. However other gelation agents are also operable and could be used. Most materials that coagulate/flocculate in an aqueous environment could be used to carry out the present invention depending upon the characteristics desired in the gel layer. For example aluminum hydroxide could be used if desired. Organic materials such as dextran, gums, free oils and the like may also be used to form the gel layer. Clays and kaolin may also be useful in forming the gel layer.

The semipermeable membrane forms the support layer for the dynamic membrane system. It may be composed of either inorganic or organic materials. The semipermeable membrane may be either a symmetrical membrane or a asymmetrical membrane. Generally, for use in removing oils and greases from aqueous waste streams inorganic materials are preferred because they are less affected by the contaminants in the waste stream and are less likely to support the growth of biological organisms. Therefore, membranes formed from porous ceramics, steel, aluminum, zirconium, and the like may be used with the invention. Particularly preferred are semipermeable membranes formed from sintered stainless steel.

Organic membranes formed from cellulose acetate and from various polymers and copolymers also may be used to carry out the invention. Operable materials may include, for example, polysulphones, polyacylonitriles, aromatic polyamides, aromatic polyhydrazines, polybenzimidazoles, polyepiamine/amides, polyepiamine/ureas, polyethyleneimine/ureas, sulfonated polyfuranes, polybenzimidazoles, polypiperazine isophthalamides, and the like.

Pore size of the semipermeable membrane will depend to a certain extent upon the gelation agent used to form the gel layer. The pore size must be small enough to prevent the gelation agent from passing through the semipermeable membrane. Generally, the pore size will be within the range from about 0.5 microns to about 5.0 microns. Under certain circumstances pore sizes above or below this range may be preferable.

In forming the gel layer Ph and temperature are believed to effect the characteristics of the dynamic membrane system. With iron hydroxide it is usually preferred that the waste stream have a pH between about 6 and about 8, and more preferably the pH will be above 7. It has been observed that the flux across the dynamic membrane system usually increases with an increase in temperature. However, the process is operable at ambient temperatures and below. In general, the filtration will be carried out at the temperature of the arriving waste stream since it is usually not practical to raise the temperature of the stream prior to feeding it to the module.

In operation it has been discovered that the dynamic membrane system is most efficient when the gel layer is detached slightly from the supporting semipermeable membrane; that is to say the gel layer most preferably floats above the semipermeable membrane with a very small space between them. This occurs normally in the present invention due to the vibration of the semipermeable membrane which serves to detach the gel layer. However, it has also been found that it may be advantageous to periodically backpulse the system e.g., momentarily reverse the flow of filtrate across the semipermeable membrane sufficient to assure separation of the gel layer but insufficient to destroy the gel layer. This backpulse is usually applied to the system at periodic intervals, generally with a frequency in the range of from about every 30 seconds to about every 5 minutes with a frequency of between about every 2 to three minutes being most common.

With the use of a stationary membrane it has been found that the flux across the membrane decreases over time and the distribution of the gel layer is uneven. The gel layer tends to become thickest near the inlet to the module and decrease in thickness toward the outlet for the concentrate. It has been found that vibrating the semipermeable membrane along its plane tends to distribute the gel layer more evenly along the surface of the semipermeable membrane. Even more important it has been discovered that the thickness of the gel layer and thus its permeability characteristics can be controlled by changing the frequency of the vibration. Thus it is an important aspect of the present invention that the efficiency of the dynamic membrane system can be controlled by varying the frequency of vibration.

It is believed that in operation the vibration sets up shear forces at the outer surface of the gel layer that result in turbulent flow of the feed stream adjacent to the surface. These forces are responsible for distributing the gelation agent on the surface and controlling its thickness.

In operation it is desirable to maintain the maximum flux across the dynamic membrane system while retaining the ability to remove the hydrocarbon contaminants from the permeate. Unlike systems described in the prior art, the system that is the subject of the present invention is able to continue to operate for long periods of time without the necessity of frequent cleaning of the module while retaining a high degree of filtration efficiency. The magnitude of the vibratory motion, i.e., the amplitude of the wave, would also have an effect upon the formation of the gel layer, but this parameter is not as easily controlled and will generally remain constant in actual practice.

Finally, the formation of the gel layer and its permeability may be controlled by adjusting the concentration of the gelation agent in the waste stream. Thus the formation of the gel layer and its filtration efficiency may be controlled by controlling several variables in the system, i.e., the gelation agent used, the concentration of the gelation agent, the pH and temperature of the waste stream feed, the frequency of the back pulse, and the speed of the vibration. Thus in practicing the invention the efficiency of the filtration will be monitored, i.e., flux rate and TOC in the filtrate, and the various control factors will be adjusted to optimize the system. Generally this will require no more than adjusting the frequency of the vibration.

The equipment used in practicing the process of the present invention may take a number of forms and utilize semipermeable membranes of different configurations. For example, the semipermeable membrane may be in the shape of a tube or tubule, a flat plate, or it may be spirally wound.

The process that is the present invention has been found to be particularly advantageous when certain hydrocarbonaceous contaminants are present. For example, it has been found that the presence of naphthenates in the waste stream result in dramatic drops in the fluxate across conventional ceramic is membranes. Using the present invention, however, results in better performance of the membrane system and improved rates of flux.

What is claimed is:

1. A Process for recovering water with a lower concentration of hydrocarbon contamination from an aqueous waste stream containing free hydrocarbon contaminants comprising the steps of:
   (a) contacting the waste stream feed containing free hydrocarbon contaminants and a gelation agent in parallel flow under pressure with the outer surface of a semipermeable membrane having an inner and outer surface;
   (b) controlling the concentration of said gelation agent in the waste stream by feeding the gelation agent to a concentration calculated to form a gel layer on the outer surface of the semipermeable membrane, whereby the gel layer and the semipermeable membrane form a dynamic membrane system capable of separating the waste stream into a retentate component on the outer surface of the dynamic membrane system and a filtrate component on the inner surface of the semipermeable membrane;
   (c) creating a controlled shear force at the outer surface of the gel layer by vibrating the semipermeable membrane at a preselected frequency and amplitude in a plane parallel to that of the semipermeable membrane of sufficient magnitude to create turbulent flow at the outer surface of the gel layer in order to maintain an optimal thickness of the gel layer such that the flux across the dynamic membrane system is maximized and the concentration of the hydrocarbon contaminant in the filtrate component is minimized;
   (d) collecting separately the filtrate component and the retentate component, the filtrate component containing water with a reduced concentration of the hydrocarbon contaminant relative to the waste stream feed.

2. The process of claim 1 wherein the frequency and amplitude of the vibration is controlled at a level calculated to detach the gel layer from the semipermeable membrane.

3. The process of claim 1 including the additional step of periodically backpulsing the filtrate across the semipermeable membrane.

4. The process of claim 1 wherein the gelation agent is iron hydroxide.

5. The process of claim 1 wherein the pH of the waste stream feed is adjusted to between about 6 and about 8.

6. The process of claim 1 wherein the magnitude of the vibratory motion is constant and the frequency is varied to control the thickness of the gel layer.

7. The process of claim 1 wherein the semipermeable membrane is made from a porous inorganic material.

8. The process from claim 7 wherein the inorganic material is stainless steel.

9. The process of claim 1 wherein the aqueous waste stream is from an off-shore oil platform.

* * * * *